United States Patent
Kong

(10) Patent No.: US 7,662,319 B2
(45) Date of Patent: Feb. 16, 2010

(54) SYSTEM AND METHOD FOR TWO-SHOT MOLDING CRASH PAD

(75) Inventor: Byung Seok Kong, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 220 days.

(21) Appl. No.: 11/966,415

(22) Filed: Dec. 28, 2007

(65) Prior Publication Data

US 2009/0115085 A1 May 7, 2009

(30) Foreign Application Priority Data

Nov. 5, 2007 (KR) .................. 10-2007-0112081

(51) Int. Cl.
*B29C 45/13* (2006.01)
*B29C 45/76* (2006.01)

(52) U.S. Cl. .................. 264/40.1; 264/328.8; 425/130; 425/145

(58) Field of Classification Search ............... 264/40.1, 264/40.6, 40.7, 328.8; 425/143, 144, 145, 425/130

See application file for complete search history.

(56) References Cited

U.S. PATENT DOCUMENTS

| | | | | |
|---|---|---|---|---|
| 3,051,994 | A * | 9/1962 | Carozzo | 264/241 |
| 3,950,483 | A * | 4/1976 | Spier | 264/241 |
| 4,201,209 | A * | 5/1980 | LeVeen et al. | 604/218 |
| 5,618,485 | A * | 4/1997 | Gajewski | 264/255 |
| 5,639,405 | A * | 6/1997 | Erikson | 264/40.3 |
| 5,750,062 | A * | 5/1998 | Tsukamoto | 264/154 |
| 6,063,315 | A * | 5/2000 | Keller et al. | 264/40.1 |
| 6,623,688 | B2 * | 9/2003 | Gedritis et al. | 264/513 |

* cited by examiner

*Primary Examiner*—Jill L Heitbrink
(74) *Attorney, Agent, or Firm*—Morgan, Lewis & Bockius LLP

(57) ABSTRACT

A system and a method for two-shot molding a crash pad, in which a passenger side air bag (PAB) door region is more flexible than other regions is disclosed. The system includes a first resin supply unit, a second resin supply unit, a temperature sensor mounted on a predetermined position of a mold, adjacent to a target material interface, and a controller for controlling a time at which to supply the second resin into the passenger side air bag region based on a detection signal from the temperature sensor. This system is cost effective and can maintain a uniform interface between different types of materials.

10 Claims, 2 Drawing Sheets

SYSTEM AND METHOD FOR TWO-SHOT MOLDING CRASH PAD

CROSS-REFERENCE TO RELATED APPLICATIONS

This application claims priority to Korean Application No. 10-2007-0112081, filed on Nov. 5, 2007, the disclosure of which is incorporated herein by reference.

BACKGROUND OF THE INVENTION

1. Field of the Invention

The present invention relates to a system and a method for two-shot molding a crash pad in which a passenger side air bag door region is more flexible than other regions.

2. Description of the Related Art

A crash pad is an interior part, which is disposed in front of a driver's seat and is also called an instrument panel or a dashboard. A crash pad is typically fabricated using a two-shot molding method, in which two types of resins are sequentially poured into a mold, so that a passenger side air bag door ("PAB door") can be more flexible than other regions of the crash pad.

When conventional two-shot molding is used to form a crash pad, a groove is formed by a second resin feed line in the surface of the central portion of the PAB door. In order to improve the aesthetic appearance, a cap or trim piece must be used to conceal the groove. However, the addition of such a cap to the PAB door makes it difficult to reduce the cost of the part.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a system and a method for two-shot molding a crash pad in which an additional cap is not attached to a PAB door after the two-shot molding, and a material interface can be maintained uniform.

According to an exemplary embodiment of the present invention, there is provided a system for two-shot molding a crash pad, in which a PAB door region is more flexible than other regions. An exemplary system of two-shot molding includes a first resin supply unit for supplying first resin into the other region; a second resin supply unit for supplying second resin into the PAB door region from a circumferential portion thereof after the first resin is supplied; a temperature sensor mounted on a mold at a predetermined position, adjacent to a target material interface, to detect the time at which the first resin from the first resin supply unit is likely to reach the PAB door region; and a controller for controlling the timing of the supply of the second resin into the PAB region based on a detection signal from the temperature sensor.

The second resin supply unit may include a single second resin feed line leading to the mold. Supplying the second resin into the mold via the single feed line makes it easy to control the material interface and is also cost effective.

The second resin may be supplied laterally from a predetermined position in the mold, corresponding to the circumferential portion of a control panel-mounting portion of the crash pad. While the second resin can be fed upwards from a mold position corresponding to the lower end of the crash pad, this position is relatively far from the target material interface, which is disadvantageous from the aspect of maintaining the material interface uniform.

A plurality of temperature sensors may be provided, and the controller may control the timing of the supply of the second resin based upon a detection signal from one of the temperature sensors, which first detects the flow of the second resin.

According to another exemplary embodiment of the present invention, there is provided a method of two-shot molding a crash pad, in which a PAB door region is more flexible than other regions. The method of two-shot molding includes steps of: mounting a temperature sensor on a predetermined position of a mold, adjacent to a target material interface, to detect the time at which first resin from a first resin supply unit reaches the PAB door region; and supplying second resin into the PAB door region from a circumferential portion thereof, after the first resin is supplied, wherein the timing of the supply of the second resin is controlled based upon a detection signal from the temperature sensor.

According to a system and method for two-shot molding a crash pad as described above, the second resin is fed laterally into the PAB door region, and thus it is not necessary to attach an additional cap to the PAB door after the two-shot molding is completed. Furthermore, the material interface can be maintained uniform by the use of the temperature sensor.

BRIEF DESCRIPTION OF THE DRAWINGS

The above and other features of the present invention will now be described in detail with reference to certain exemplary embodiments thereof illustrated the accompanying drawings which are given herein below by way of illustration, and thus are not limitative of the present invention, and wherein.

Figure 1:
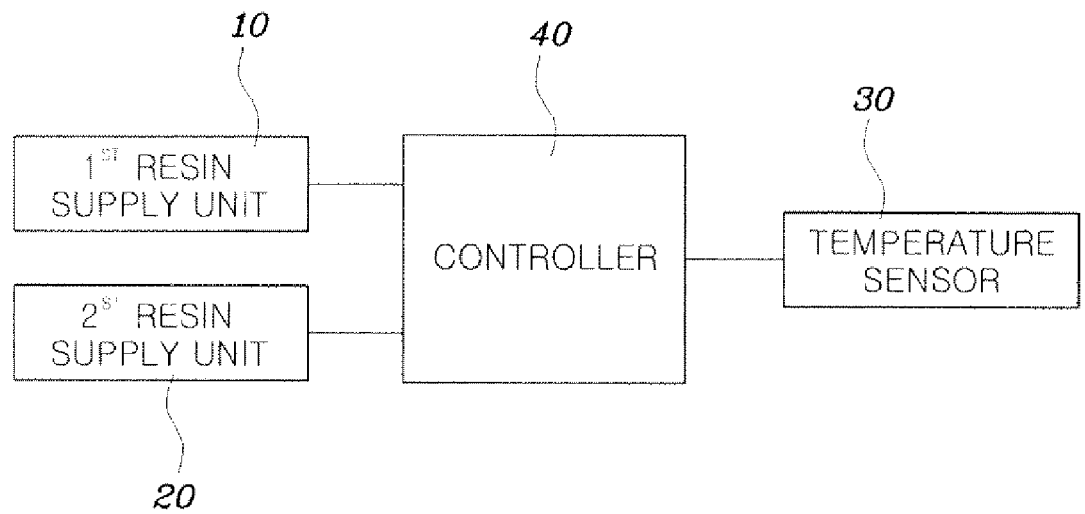
FIG. 1 is a block diagram illustrating a system for two-shot molding a crash pad according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to a preferred embodiment of the present invention, an example of which is illustrated in the accompanying drawings and described below. While the invention will be described in conjunction with an exemplary embodiment it should be understood that the description is not intended to limit the invention to the exemplary embodiment. On the contrary, the invention is intended to cover not only the exemplary embodiment but also various alternatives, modifications, equivalents and other embodiments, which may be included within the spirit and scope of the invention as defined by the appended claims.

Figure 2:
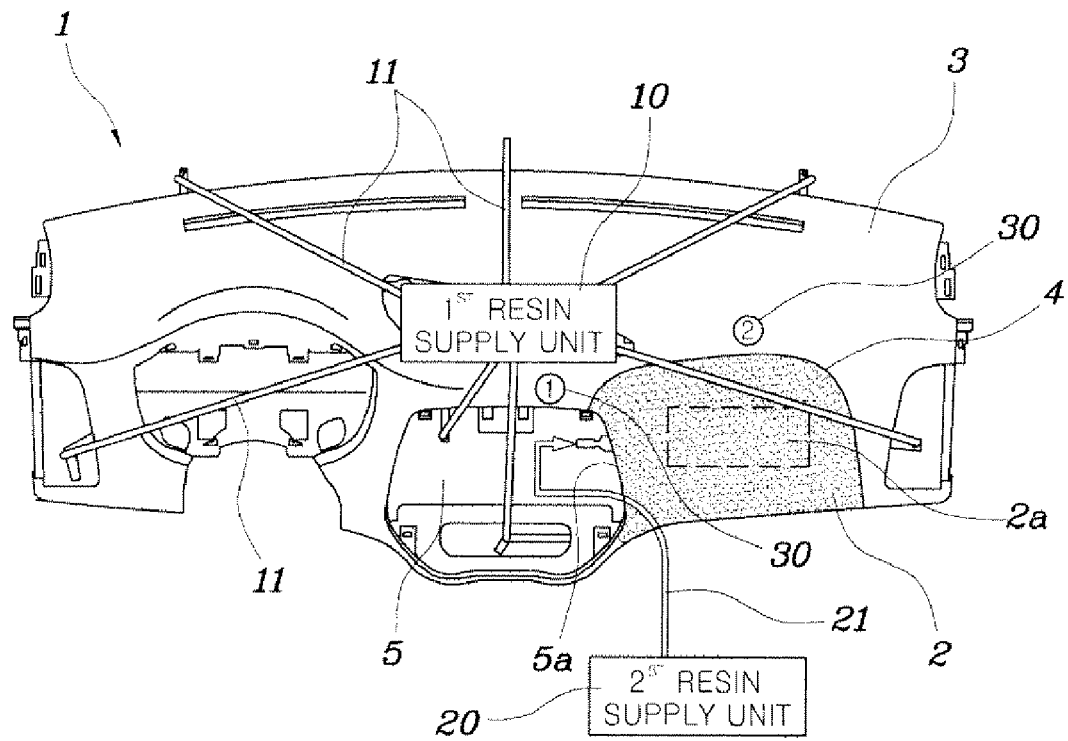
FIG. 2 is a schematic view illustrating the system for two-shot molding a crash pad shown in FIG. 1.

As shown in FIGS. 1 and 2, an exemplary embodiment of a system for two-shot molding includes a first resin supply unit 10, a second resin supply unit 20, a temperature sensor 30 and a controller 40. In FIG. 2, a mold is replaced with a crash pad 1 for the sake of clarity of illustration. Controller 40 includes a processor, memory and associated hardware and software as may be selected and programmed by a person of ordinary skill based on the teachings herein.

The first resin supply unit 10 feeds first resin into the resin via first resin feed lines 11. A plurality of first resin feed lines 11 leads to peripheral portions of the mold except for a PAB door region 2, so that the fed first resin migrates from the periphery of the mold toward the PAB door region 2. The first resin may be implemented as polypropylene fiber (PPF) resin.

The second resin supply unit 20 is configured to feed a second resin, which is softer than the first resin, into the mold via a single resin feed line 21. The second feed line 21 is connected to the periphery of the PAB door region 2. Particularly, the second feed line 21 is connected to a predetermined position of the mold, corresponding to a circumferential portion 5a of a control panel-mounting portion 5 of the crash panel, so as not to leave a mark. The second resin may be thermoplastic olefin (TPO) resin.

When the second resin is fed from the edge or the side of the PAB door region 2, the second resin is fed from an early stage so that it is certain that it is fed into the PAB door of the crash panel. Then, the PAB door region 2 or a material interface 4 is likely to widen. In order to prevent the widening, it is necessary to feed the second resin at a suitable time, so that the material interface 4 can be maintained uniform. For this purpose, temperature sensors 30 are provided in the mold.

The temperature sensors 30 are mounted at several points, designated by reference marks ① and ②, along the target material interface between the first and second resins, in order to detect the lime point at which the first resin from the first resin supply unit 10 reaches the PAB door region 2. The mounting points of the temperature sensors 30 are selected from specific areas at which the first resin rapidly flows into the PAB door region 2. Detection signals from the temperature sensor 30 are transmitted to the controller 40.

The controller 40 controls the supply of the first and second resins through the first and second resin supply units 10 and 20, and particularly, determines the time at which the second resin is supplied by the second resin supply unit 20 in response to the detection signals from the temperature sensor 30. The time at which the second resin is to be supplied is determined based upon the signal from one of the temperature sensors, which first detects the flow of the second resin. The other temperature sensors are used to measure the temperature of the first resin at their positions. The use of the temperature sensors to measure the temperature of the first resin at those positions, which are adjacent to the target material interface, makes it easy to find detects in injection molding due to the local temperature difference of the mold, caused by the local temperature difference of the mold.

Figure 3:
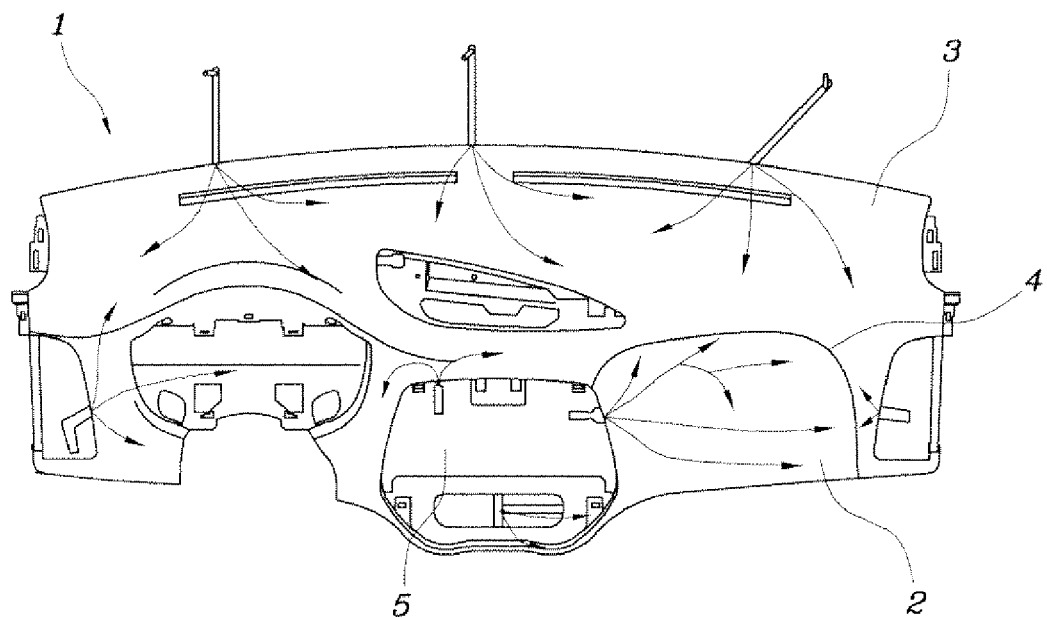
FIG. 3 is a schematic view illustrating the flow of resin after it is fed from the resin supply units shown in FIG. 2.

A method of two-shot molding a crash pad according to an exemplary embodiment of the invention will be described with reference to FIGS. 3 and 4.

In the molding of the crash pad, the controller 40 first controls the first resin supply unit 10 to feed first resin into a mold except for the PAB door region 2. Then, as shown in FIG. 2, the first resin flows along channels in the mold to thus reach positions adjacent to the target material interface 4, and the temperature sensors 30 detect the flow of the first resin and transmit detection signals to the controller 40.

When the first detection signal is received from one of the temperature sensors 30, the controller 40 immediately controls the second resin supply unit 20 to feed second resin into the PAB door region 2. Then, as shown in FIG. 3, the second resin migrates along the PAB door region 2 to form the target material interface 4 with the first resin. It is necessary to set the mounting position of the temperature sensors 30 and the time of the supply of the second resin suitably in consideration of the target material interface 4.

Figure 4:
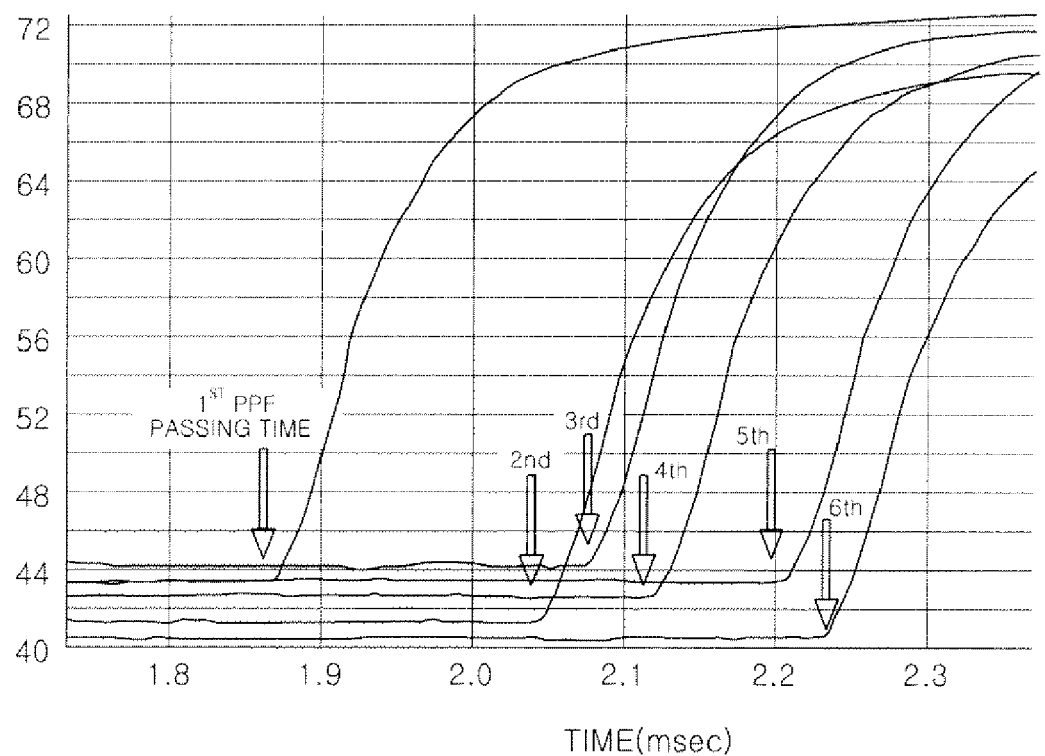
FIG. 4 is a graph illustrating examples of data detected by temperature sensors, which are designated with reference marks ① and ② in FIG. 2.

FIG. 4 is a graph illustrating first detection times of the flow of the first resin by temperature sensors 30, which is repeated six times. As shown in FIG. 4, time points at which the first resin passes by the first one of the temperature sensors 30 are different whenever the first resin is molded. Accordingly, the time point at which the second resin is supplied can be varied for every molding operation.

While the present invention has been described with reference to the particular illustrative embodiments and the accompanying drawings, it is not to be limited thereto, but will be defined by the appended claims. It is to be appreciated that those skilled in the art can substitute, change or modify the embodiments in various forms without departing from the scope and spirit of the present invention.

What is claimed is:

1. A system for two-shot molding a crash pad, in which a passenger side air bag door region is more flexible than other regions, comprising:
    a first resin supply unit for supplying first resin into mold regions other than the side air bag door region;
    a second resin supply unit for supplying second resin into the passenger side air bag door mold region from a circumferential portion thereof after the first resin is supplied;
    a temperature sensor mounted at a predetermined position in a mold, adjacent to a target material interface, to detect a time at which the first resin from the first resin supply unit is likely to reach the passenger side air bag door region; and
    a controller for controlling at time at which to supply the second resin into the passenger side air bag region based on a detection signal from the temperature sensor.

2. The system of two-shot molding according to claim 1, wherein the second resin supply unit includes a single second resin feed line leading to the mold.

3. The system of two-shot molding according to claim 1, wherein the second resin is supplied laterally from a predetermined position of the mold, corresponding to a circumferential portion of a control panel-mounting portion of the crash pad.

4. The system of two-shot molding according to claim 1, comprising a plurality of the temperature sensors,
    wherein the controller controls a time at which to supply the second resin based upon a detection signal from one of the temperature sensors that first detects flow of the second resin.

5. A method of two-shot molding a crash pad, in which a passenger side air bag door region is more flexible than other regions, comprising:
    mounting a temperature sensor in a predetermined position of a mold, adjacent to a target material interface, to detect a time at which first resin from a first resin supply unit reaches the passenger side air bag door region; and
    supplying second resin into the passenger side air bag door region from a circumferential portion thereof, after the first resin is supplied, wherein a timing of the supplying the second resin is controlled based upon a detection signal from the temperature sensor.

6. The method of two-shot molding according to claim 5, wherein a plurality of the temperature sensors is provided, and the timing of the supplying the second resin is controlled based upon a detection signal from one of the temperature sensors that first detects the flow of the second resin.

7. A system for two-shot molding a crash pad, comprising:
 a crash pad mold having a passenger side air bag door region having a circumferential portion around an outside of said region and other regions;
 a first resin supply unit communicating with said other regions;
 a second resin supply unit communicating with the passenger side air bag door region along said circumferential portion;
 at least one temperature sensor mounted in the mold adjacent to a target material interface along said circumferential portion;
 a controller communicating with said at least one temperature sensor and receiving a signal therefrom indicative of a time at which first resin from said first resin supply unit is will reach the passenger side air bag door region and controlling the time of supply of a second resin from the second resin supply unit based on said signal.

8. The system of two-shot molding according to claim 7, wherein the second resin supply unit includes a single second resin feed line leading to the mold.

9. The system of two-shot molding according to claim 7, wherein the second resin is supplied laterally from a predetermined position of the mold, corresponding to a circumferential portion of a control panel-mounting portion of the crash pad.

10. The system of two-shot molding according to claim 7, comprising a plurality of the temperature sensors,
 wherein the controller controls a time at which to supply the second resin based upon a detection signal from one of the temperature sensors that first detects flow of the second resin.

* * * * *